United States Patent [19]

Hall

[11] Patent Number: 4,664,896

[45] Date of Patent: May 12, 1987

[54] PROCESS FOR PURIFYING YELLOW PHOSPHORUS

[75] Inventor: Richard E. Hall, Trenton, N.J.

[73] Assignee: FMC Corporation, Philadelphia, Pa.

[21] Appl. No.: 551,779

[22] Filed: Nov. 14, 1983

[51] Int. Cl.$^4$ .................. C01B 25/047; C01B 25/12
[52] U.S. Cl. .................................. 423/304; 423/322
[58] Field of Search ..................... 423/299, 304, 322

[56] References Cited

U.S. PATENT DOCUMENTS

| | | | |
|---|---|---|---|
| 1,044,957 | 11/1912 | Washburn | 423/304 |
| 2,221,770 | 11/1940 | Almond | 423/304 |
| 3,205,041 | 9/1965 | Cremer et al. | 423/303 |
| 3,836,675 | 9/1974 | Hartlapp et al. | 423/322 |

FOREIGN PATENT DOCUMENTS

| | | | |
|---|---|---|---|
| 1143795 | 9/1961 | Fed. Rep. of Germany | 423/322 |
| 7209052 | 1/1973 | Netherlands | 423/322 |

OTHER PUBLICATIONS

Chemical Engineer's Handbook–5th ed. Ed. by Robert H. Perry, Cecil H. Chilton, McGraw-Hill Book Co. pp. 19–63.

Kogyo Kagaku Zasshi, 1968, 71(8)1150–4.

*Primary Examiner*—John Doll
*Assistant Examiner*—Jeffrey Edwin Russel
*Attorney, Agent, or Firm*—Robert D. Jackson; Frank Ianno

[57] ABSTRACT

In the process of purifying yellow phosphorus by treating liquid yellow phosphorus with active carbon and separating the purified phosphorus from the spent active carbon containing adhering phosphorus, the spent active carbon is mixed with sufficient liquid phosphorus to form a slurry which is pumped to a disposal zone. The disposal zone is preferably a phosphorus furnace.

5 Claims, No Drawings

PROCESS FOR PURIFYING YELLOW PHOSPHORUS

This invention relates to the purification of yellow phosphorus, particularly by treating it with active carbon.

Yellow phosphorus is a familiar industrial chemical which constitutes the basic starting material for the manufacture of numerous phosphorus compounds. One important member of the group is phosphorus pentasulfide, a key intermediate used in preparing organic phosphorus derivatives, for example, dithiophosphates. These products, however, often contain objectionable coloration when made from commercial yellow phosphorus owing to the presence therein of organic impurities, typically in the range of about 100 to 3000 ppm, expressed as total organic carbon (TOC). As a consequence, such impurities may have to be removed, or at least reduced, in order to provide phosphorus pentasulfide which meets color tolerances.

An industrial process for purifying yellow phosphorus consists of washing the melted phosphorus with sulfuric acid. Although effective, the technique is objectionable owing to the high corrosivity of sulfuric acid; metal parts must be acid resistant or provided with a protective coating. Furthermore, spent sulfuric acid also poses a disposal problem. Another approach to purifying yellow phosphorus is by treating it with activated carbon of which the method described in U.S. Pat. No. 3,836,675 is effective and simple to carry out. According to this patent, commercial yellow phosphorus is purified by mixing it in liquid form with an aqueous suspension of active carbon containing between 50 and 500 Kg/cubic meter of active carbon having an inner surface of at least 800 square meters. The amount of carbon suspension is about 0.5 to 5.0% by weight of the phosphorus. Mixing periods range from about 0.5 to 15 minutes. The purified phosphorus is separated from the active carbon by filtration.

Although generally satisfactory, the phosphorus purification disclosed in U.S. Pat. No. 3,836,675 is troublesome to carry out in that the spent active carbon presents a handling and disposal problem that is at least the equal of the sulfuric acid purification method. The spent carbon collects in the filter system as a waxy semisolid containing about 30% phosphorus. It is totally immiscible with water and thus cannot be washed or flushed from equipment and lines. Apparently, the phosphorus is strongly bound to the carbon particles which are thereby rendered extremely hydrophobic. Yet the spent carbon must be kept moist at all times since there is danger of fire if it is exposed to the air. Manifestly, the onerous nature of this waste product greatly detracts from the practicability of purifying yellow phosphorus by treatment with active carbon.

In accordance with the present invention, a process has been found for handling and disposing of the spent activated carbon from the aforedescribed purification of yellow phosphorus, and the provision of said process constitutes the principal object and purpose of the invention.

The process of the invention herein is predicated on the discovery that the presence of sufficient liquid yellow phosphorus, the spent active carbon from the purification of yellow phosphorus is converted into a readily flowable slurry which can be pumped to a disposal zone without the necessity of handling the spent active carbon directly. In carrying out the process of the invention, yellow phosphorus in liquid form is mixed with active carbon following generally the known procedure. A carbon concentration of about 0.2 weight percent based on the weight of phosphorus was found to be effective in reducing the organic impurities in the phosphorus from 460 ppm to an acceptable 60 ppm. The amount of active carbon can be adjusted proportionally for higher or lower ranges of organic impurities. Overall, a weight percent of active carbon of from about 1.0 to about 0.2 will take care of the organic impurities normally found in commercial yellow phosphorus, that is, about 100 to 3000 ppm. The active carbon should have an adsorptive surface area of at least about 800 $m^2/g$ and preferably about 1000 $m^2/g$ and should remain in contact with the liquid phosphorus until the concentration of organic impurities in the phosphorus are in equilibrium with the concentration of organic impurities on the carbon. Contact times are typically about one hour. The purified phosphorus is separated from the spent carbon by known techniques, for example, filtration or centrifugation. Liquid yellow phosphorus is then mixed with the spent active carbon to form a slurry which is conveyed to a disposal zone. Normally, a satisfactory slurry, capable of being pumped, consists of about 50/50 mixture by weight of spent carbon and phosphorus. A higher phosphorus content, although it does no harm, is generally not needed and may be uneconomical.

The separation of the purified yellow phosphorus from the spent carbon is conveniently carried out by means of a centrifugal filter. After filtration is complete, the spent carbon, assaying at about 30–35% phosphorus, is spun off the revolving filter plates into a collection chamber and mixed with sufficient liquid yellow phosphorus to form a 50/50 carbon/phosphorus pumpable slurry which is pumped to the disposal zone.

A decided advantage of the present invention is that it provides a means of handling the phosphorus/carbon filter cake in a safe and convenient manner. Since the filter cake is not removed directly from the filter equipment but remains therein protected from the atmosphere while being formed into a slurry, the risk of fire is greatly minimized. A particularly important advantage of the invention is that it provides a technique for disposing of the onerous phosphorus/carbon by-product of phosphorus purification that does not require an additional processing step or pose any environmental hazards. The advantage aforesaid can be realized by introducing the phosphorus/carbon slurry into a phosphorus furnace where the spent carbon supplements the carbonaceous reductant normally present as part of the ore charge in the furnace. At the same time, the phosphorus in the filter cake is vaporized to become mingled with the phosphorus vapor from the furnace. These combined vapors are condensed and the phosphorus recovered, including that contributed by the filter cake. Any filter aid, such as diatomaceous earth or similar minerals present in the filter cake, is removed as part of the furnace slag. The phosphorus/carbon filter cake can also be fed into a phosphorus burner where phosphorus is combusted to give phosphorus pentoxide which is used in the manufacture of phosphoric acids and phosphate salts. When disposed of in this manner, the filter cake should not contain mineral filter aids since these would contaminate the phosphorus pentoxide. The carbon is burned to carbon dioxide and thus does not produce solid contaminants.

The following examples further illustrate the process of the invention.

EXAMPLE 1

Approximately 50 grams of elemental phosphorus were placed in the bottom of the resin kettle with 25 grams of deionized water and 0.5 grams of Type BL activated carbon, obtained from the Calgon Corporation, Calgon Center, Box 1346, Pittsburgh, Pa. 15230. The BL activated carbon was used in this and the other examples herein. Specifications of Type BL activated carbon are as follows:

|  | Type BL |
|---|---|
| Total Surface Area (N$_2$BET Method*), m$^2$/g | 1000-1100 |
| Apparent Density (bulk density, dense packing), g/cc | 0.51 |
| Real Density (He displacement), g/cc | 2.10 |
| Pore Volume (within particle), cc/g | 0.90 |
| Specific Heat at 100° C. | 0.25 |

*Brunauer, Emmett, and Teller, J.A. Chem. Soc. 60, 309 (1938)

A three neck top with an overhead mechanical stirrer fitted to the center neck was placed on the resin kettle. The other necks were fitted with nitrogen introduction and discharge tubes. The nitrogen gas discharged into a gas wash bottle containing water. After the resin kettle was flushed with nitrogen, 65° C. water was pumped through the jacket of the resin kettle. The mixture of phosphorus, carbon and water was agitated vigorously after the phosphorus had melted. After the mixture was stirred for the desired length of time, the agitation was stopped. The jacket water was cooled to 25° C. to solidify the phosphorus.

Approximately 10 grams of diatomaceous earth filter aid was slurried in 100 mls of deionized water. This slurry was filtered through a 650 milliliter medium porosity glass filter funnel to give ¼ inch cake of damp filter aid on the filter surface. The solid phosphorus carbon pieces were placed in the precoated filter and covered with deionized water. A large rubber stopper equipped with nitrogen and water inlet tubes was clamped tightly to the top of the filter funnel. The funnel stem was placed in a polypropylene bottle and the entire apparatus was placed in a water bath. The bath was heated to 80° C. with steam. Nitrogen pressure was applied to the top of the filter funnel to force the molten phosphorus through the filter and into the polypropylene bottle. After the phosphorus and water had been forced through the filter, water was added to cover the carbon slurry. The polypropylene bottle was removed from the bath, capped and allowed to cool. The phosphorus was removed for testing by cutting the bottle away from the solid phosphorus under cold, <40° C., water. Quality of the phosphorus was determined by measuring the total organic carbon levels in the phosphorus or by measuring the color in ethanol of P$_2$S$_5$ prepared from the treated phosphorus. The phosphorus pentasulfide was prepared in a glass batch laboratory reactor or in the plant reactors.

Coloration of the P$_2$S$_5$ was measured using APHA ASTM Method D-2849. Ten grams of P$_2$S$_5$ were placed in an empty 250 ml Erlenmeyer flask and 100 mls of 100% ethyl alcohol was added. The flask was connected to a cooled reflux condenser and heated to 75° C. with a heating mantle. The solution was stirred and maintained at 75° C. for 30 minutes. Hydrogen sulfide that was evolved was scrubbed through a gas wash bottle containing 10% sodium hydroxide solution. The solution was cooled and filtered to remove any solid residue. The solution color was compared with APHA color standards.

A series of carbon treatment runs was made in the laboratory as outlined above to determine the amount of time the carbon should contact the phosphorus. Times of one-half, one and two hours were tried at a one weight percent carbon level. The following runs were carried out:

| Run | Contact Time (Hours) | APHA Color P$_2$S$_5$ in Ethanol |
|---|---|---|
| 1 | ½ | 65 |
| 2 | 1 | 40 |
| 3 | 2 | 40 |

This data shows an improvement in color when the contact time was increased from one-half to one hour but no further improvement by increasing the contact time to two hours. The P$_2$S$_5$ made from unpurified phosphorus would have an APHA color in ethanol greater than 100. Many commercial specifications call for APHA color values less than 100. Therefore, a contact time of one hour is adequate for most plant and laboratory operations.

EXAMPLE 2

A second set of laboratory carbon treatment runs was made to determine the amount of carbon needed to remove the organic impurities from the phosphorus. BL grade carbon was used at levels from 0.05 to 1.0 weight percent at a contact time of one hour. The following runs were carried out:

| Run | Wt. % BL Pulverized Carbon | APHA Color P$_2$S$_5$ in Ethanol |
|---|---|---|
| 1 | 0.05 | 90 |
| 2 | 0.1 | >100 |
| 3 | 0.2 | 45 |
| 4 | 0.4 | 45 |
| 5 | 1.0 | 40 |

This data shows that a carbon level of 0.2 weight percent or greater is needed to remove the organic impurities in the phosphorus which cause color in the diethyl dithiophosphate.

EXAMPLE 3

A set of plant tests of the carbon treatment of phosphorus was carried out in a 4000 gallon tank. This tank was fitted with an electric stirring motor mounted off center on the top of the tank. The motor turned 8, 16 inch paddles equally spaced along the stirrer shaft. A 45,000 pound batch of yellow phosphorus was pumped into the 4000 gallon tank under an 18 inch layer of water for each run. The desired quantity of powdered carbon was added through a nozzle on the top of the tank and the mixture was agitated continuously. A one hour contact time was used for the tests and the carbon levels were varied. Phosphorus pentasulfide was made from the carbon purified phosphorus in the laboratory. The total organic carbon levels in phosphorus samples were measured before the P$_2$S$_5$ was prepared from them. The following runs were carried out:

| Run | Weight % BL Pulvarized Carbon | TOC on $P_4$ Samples | APHA Color $P_2S_5$ in Ethanol |
|---|---|---|---|
| 1 (Untreated $P^o$) | 0.00 | 457 | >100 |
| 2 ($H_2SO_4$ Purified $P^o$) | 0.00 | 45 | 30 |
| 3 | 1.0 | 33 | 55 |
| 4 | 0.5 | 46 | 65 |
| 5 | 0.2 | 23 | 55 |
| 6 | 0.1 | 34 | 80 |

The examples show the large decrease in the total organic carbon content of the phosphorus samples that had been carbon treated or purified with sulfuric acid when compared to the untreated phosphorus. The total organic carbon content of the carbon treated phosphorus is equivalent to treating phosphorus with sulfuric acid, a common purification technique. Therefore, carbon treatment of phosphorus with 0.2 weight percent or more Calgon BL pulverized carbon gives phosphorus and therefore $P_2S_5$ of comparable quality to that from sulfuric acid purification. The large advantage of the carbon treatment process is the disposal of the carbon and phosphorus filter cake in the phosphorus furnace. Most of the carbon and phosphorus values are recovered. Disposal of the waste sulfuric acid is difficult and expensive.

What is claimed is:

1. In the purification of yellow phosphorus by mixing liquid yellow phosphorus with active carbon and recovering the purified phosphorus, the improvement for disposing of the spent carbon comprising mixing sufficient liquid phosphorus with the spent carbon to form a pumpable slurry and pumping the slurry to a disposal zone.

2. The improvement of claim 1 wherein the slurry is about a 50/50 mixture by weight of spent carbon and phosphorus.

3. The improvement of claim 1 wherein the spent carbon contains a mineral filter aid.

4. The improvement according to claim 1 wherein the disposal zone is a phosphorus burner.

5. The improvement according to claim 2 wherein the disposal zone is an electric phosphorus furnace.

* * * * *